United States Patent
Stephenson

(10) Patent No.: US 11,110,900 B2
(45) Date of Patent: Sep. 7, 2021

(54) VEHICLE SENSING AND GUIDANCE SYSTEM FOR A VEHICLE WASH, AND A VEHICLE WASH

(71) Applicant: Stephenson Technologies Inc., Barrie (CA)

(72) Inventor: Robert Roy Stephenson, Barrie (CA)

(73) Assignee: Stephenson Technologies Inc., Barrie (CA)

( * ) Notice: Subject to any disclaimer, the term of this patent is extended or adjusted under 35 U.S.C. 154(b) by 0 days.

(21) Appl. No.: 16/812,250

(22) Filed: Mar. 6, 2020

(65) Prior Publication Data
US 2020/0282958 A1 Sep. 10, 2020

Related U.S. Application Data

(60) Provisional application No. 62/814,535, filed on Mar. 6, 2019.

(51) Int. Cl.
| | |
|---|---|
| *B60S 3/04* | (2006.01) |
| *G05D 1/02* | (2020.01) |
| *B60Q 9/00* | (2006.01) |
| *G06K 9/00* | (2006.01) |

(52) U.S. Cl.
CPC ............... *B60S 3/04* (2013.01); *B60Q 9/008* (2013.01); *G05D 1/0214* (2013.01); *G05D 1/0223* (2013.01); *G06K 9/00798* (2013.01); *G05D 2201/0213* (2013.01)

(58) Field of Classification Search
CPC ...... B60S 3/04; B60S 3/00; B60S 1/66; B60S 3/004; B60Q 9/008; G05D 1/0214; G05D 1/0223; G05D 15/00; G05D 2201/0213; G05D 15/02; G06K 9/00798; G03F 7/0275; G03F 7/36; B08B 5/04
See application file for complete search history.

(56) References Cited

U.S. PATENT DOCUMENTS

| | | | |
|---|---|---|---|
| 6,661,516 B1 * | 12/2003 | Dietsch ................... | B60S 3/002 356/399 |
| 7,318,442 B2 * | 1/2008 | MacDowell ............ | B60S 3/004 134/113 |
| 2011/0197922 A1 | 8/2011 | Turner et al. | |
| 2014/0048104 A1 | 2/2014 | Stadler | |

(Continued)

FOREIGN PATENT DOCUMENTS

EP 1795409 A2 6/2007

OTHER PUBLICATIONS

International Search Report and Written Opinion for PCT/CA2020/050311 dated Jun. 4, 2020.

*Primary Examiner* — Robert J Scruggs
(74) *Attorney, Agent, or Firm* — Millman IP Inc.

(57) ABSTRACT

A vehicle sensing and guidance system for a vehicle wash, and a vehicle wash, are provided. The system includes a first vehicle sensing system having at least one sensor configured to detect a vehicle and generate sensor data, a storage storing computer readable instructions, at least one processor that, when executing the computer readable instructions, determines a pose of the first vehicle using the sensor data, and at least one output device configured to present at least one of a first vehicle positioning marker and a vehicle positioning signal at least partially based on the pose of the first vehicle.

23 Claims, 16 Drawing Sheets

(56) References Cited

U.S. PATENT DOCUMENTS

2015/0273531 A1   10/2015  Oliver
2016/0362089 A1*  12/2016  Lapeer ..................... B60S 3/04
2017/0337815 A1   11/2017  Reed et al.
2018/0281752 A1*  10/2018  Detrick .................... B60S 3/04
2018/0345918 A1*  12/2018  Foerg ...................... B60S 3/04

* cited by examiner

VEHICLE SENSING AND GUIDANCE SYSTEM FOR A VEHICLE WASH, AND A VEHICLE WASH

CROSS-REFERENCE TO RELATED APPLICATIONS

This application claims the benefit of U.S. Provisional Patent Application No. 62/814,535, filed Mar. 6, 2019, the contents of which are incorporated herein by reference in their entirety.

FIELD

The specification relates generally to vehicle washes, and in particular to a vehicle sensing and guidance system for a vehicle wash, and a vehicle wash.

BACKGROUND OF THE DISCLOSURE

Vehicle washes are known. A vehicle approaches an initial position at an entrance of a vehicle wash, where the vehicle may be engaged by a conveyor system, such as a single driven conveyor belt or a pair of driven conveyor belts configured to be positioned under wheels of the vehicle. The vehicle wash can include a set of guide rails to guide at least the front wheels of the vehicle to a desired lateral position on the conveyor system. Upon positioning at least the front wheels of the vehicle atop of the conveyor system, the conveyor system is operated to drive the conveyor belt(s) to rotate, thereby conveying the vehicle positioned at least partially thereon forward.

In a first stage of the vehicle wash, a washer system washes the exterior surface of the vehicle. The washing can be done via jets of a washing fluid, such as a soapy water, rotating or oscillating brushes doused in the washing fluid, etc. In a second stage, the washing fluid is rinsed from the exterior surface of the vehicle via rinsing fluid, such as water, ejected by rinsing outlets. In a third stage, the rinsing fluid can be dried from the exterior surface of the vehicle via a set of blowers.

It is known at each stage to position the appropriate equipment based on the sensed position of the vehicle, as it can be desirable to operate equipment at each stage within a desired distance range from the vehicle. For example, the position of the rotating or oscillating brushes can be varied to accommodate vehicles of different dimensions and forms to ensure that the fibres of the brushes reach the exterior surface of the vehicle to clean it sufficiently without approaching the exterior surface of the vehicle too closely, as damage can occur to the exterior surface of the vehicle. In order to better rinse the washing fluid from the first stage, the rinsing outlets can be positioned within a desirable distance range to ensure that the force of the pressurized rinsing fluid ejected from the rinsing outlets does not damage the exterior surface of the vehicle and as much of the rinsing fluid is sprayed onto the vehicle and is not directed into the surrounding environment adjacent the vehicle. Positioning of the blowers in a vehicle wash within a desired distance range can ensure that the as much of the blown air is directed to force rinsing fluid off of the exterior surface of the vehicle for efficiency without the blowers contacting the exterior surface of the vehicle.

Where the equipment is positioned within a desired distance range from the vehicle, sensors are used to detect the current position of the vehicle. The sensors can be dynamically positioned with the equipment or can be statically positioned. In either case, the brushes, washing fluid, and rinsing fluid can interfere with the sensing of the vehicle, making accurate vehicle position locating difficult.

Often times, attendants assist in directing a driver of a vehicle to position and orient the vehicle so that it is in a correct pose to enter the vehicle wash so that the vehicle wash can be operated without causing damage to the vehicle and/or the vehicle wash equipment. This can make operation of the vehicle wash more expensive and/or less profitable, especially during night hours, when there may be a reduced frequency of clientele.

SUMMARY OF THE DISCLOSURE

In one aspect, there is provided a vehicle sensing and guidance system for a vehicle wash, comprising: a first vehicle sensing system having at least one sensor configured to detect a vehicle and generate sensor data; a storage storing computer readable instructions; at least one processor that, when executing the computer readable instructions, determines a pose of the first vehicle using the sensor data; and at least one output device configured to present at least one of a first vehicle positioning marker and a vehicle positioning signal at least partially based on the pose of the first vehicle.

The at least one of a first vehicle positioning marker and a vehicle positioning signal can be presented to a driver of the first vehicle.

The system can further comprise at least one display positioned inside of a structure of the vehicle wash for presenting the at least one of the vehicle positioning marker and the vehicle positioning signal to the driver of the first vehicle.

The at least one of a first vehicle positioning marker and a vehicle positioning signal can be presented to a driver of a second vehicle behind the first vehicle. The at least one processor, when executing the computer readable instructions, can determine the velocity of the second vehicle from the sensor data. The at least one processor, when executing the computer readable instructions, can generate the at least one of the vehicle positioning marker and the vehicle positioning signal at least partially based on the velocity of the second vehicle.

The at least one sensor can include at least one imaging sensor module.

The at least one sensor can include at least one sonic sensor module.

The at least one output device can include at least one display.

The at least one processor, when executing the computer readable instructions, can generate a surface map of the first vehicle via the sensor data. The at least one processor, when executing the computer readable instructions, can determine the pose of the first vehicle from the surface map of the first vehicle.

The at least one processor, when executing the computer readable instructions, can determine a velocity of the first vehicle from the sensor data, and generate the at least one of the first vehicle positioning marker and the vehicle positioning signal at least partially based on the velocity of the first vehicle.

The at least one processor, when executing the computer readable instructions, can determine a velocity of the second vehicle from the sensor data, and determine the at least one of the second vehicle positioning marker and the vehicle positioning signal at least partially based on the velocity of the second vehicle.

The first vehicle positioning marker can indicate at least one of a target position and a target position range along a lateral axis normal to a vehicle travel direction through the vehicle wash.

The vehicle positioning marker can indicate at least one of a target position and a target position range along a longitudinal axis parallel to a vehicle travel direction through the vehicle wash. The vehicle positioning marker can include a second edge normal to the vehicle travel direction. The second vehicle positioning marker can be spaced laterally from the first vehicle positioning marker along a lateral axis normal to the vehicle travel direction through the vehicle wash and defines at least one of a target position and a target position range.

The first vehicle positioning marker can include a lateral edge parallel to the vehicle travel direction. The first vehicle positioning marker can include a median line parallel to the vehicle travel direction. The first vehicle positioning marker can include a lateral line parallel to the vehicle travel direction. The system can further include a conveyor system configured to engage at least one wheel of vehicles along one lateral side thereof; and wherein the lateral line is positioned to align the at least one wheel along the lateral side of the first vehicle with the chain drive.

The first vehicle positioning marker can indicate at least one of a target position and a target position range along a longitudinal axis parallel to a vehicle travel direction through the vehicle wash. The first vehicle positioning marker can include a longitudinal edge normal to the vehicle travel direction. The longitudinal edge can be at least a minimum target distance from a rear of the first vehicle. The longitudinal edge can be a target distance from the rear of the first vehicle, and the target distance can be dynamically determined.

In another aspect, there is provided a vehicle wash, comprising: a vehicle sensing system having at least one sensor to detect a vehicle and generate sensor data as the vehicle is approaching the vehicle wash; a storage storing computer readable instructions; and a processor that, when executing the computer readable instructions, determines a surface map of the vehicle using the sensor data, the processor controlling operation of the vehicle wash at least partially based on the surface map of the vehicle.

The at least one processor, when executing the computer readable instructions, can determine a pose from a surface map of the first vehicle.

The at least one processor, when executing the computer readable instructions, can retrieve a model surface map. The at least one processor, when executing the computer readable instructions, can detect a vehicle surface variance using the vehicle surface map, and can adjust the operation of the vehicle wash at least partially based on the presence of the vehicle surface variance.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Figure 1:
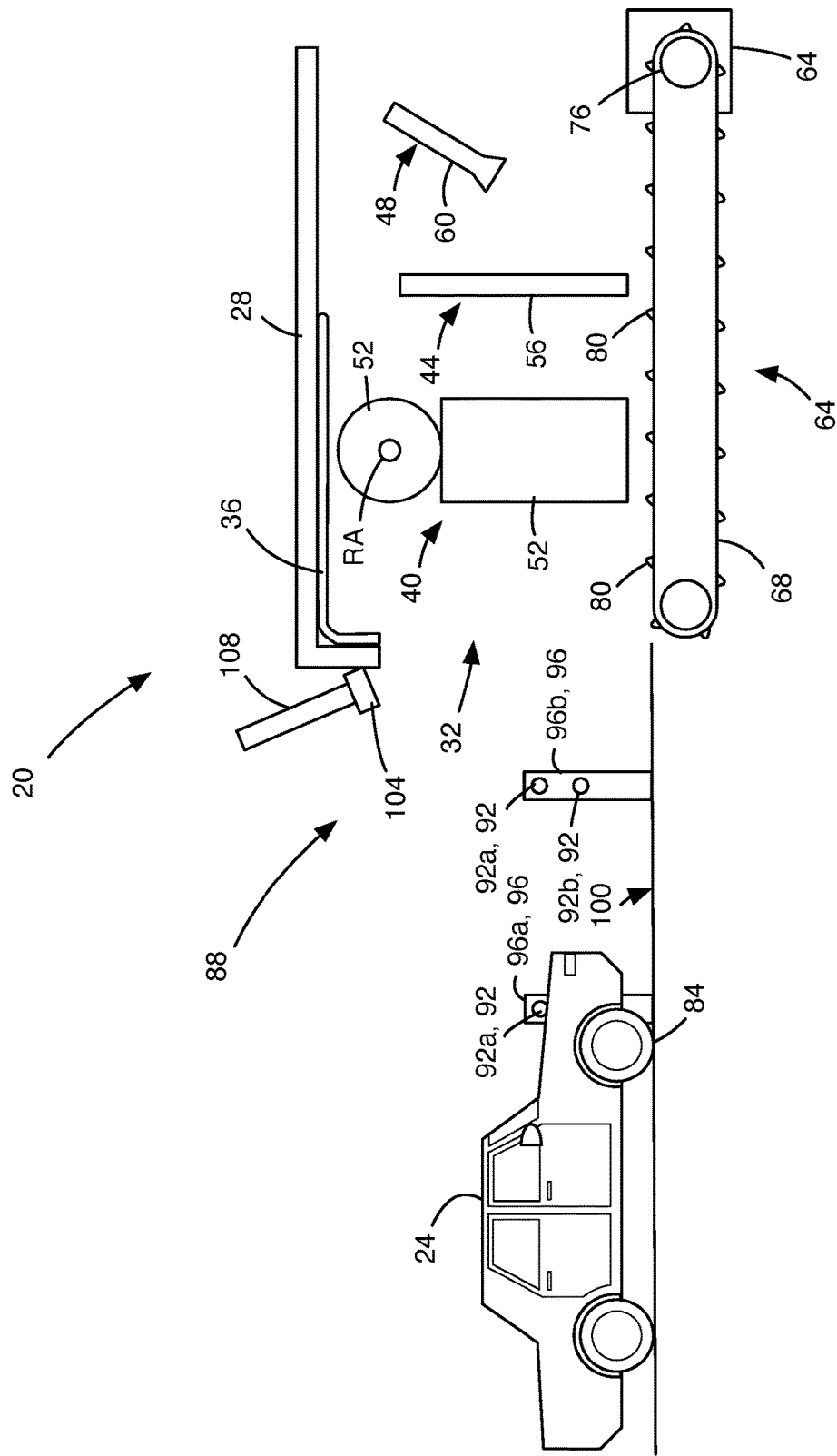
FIG. 1 is a side schematic diagram of a vehicle wash using a vehicle sensing system in accordance with an embodiment.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

A vehicle wash 20 for a vehicle 24 in accordance with an embodiment is shown in FIG. 1. The vehicle wash 20 includes a building structure 28 having a vehicle entrance 32 that is sealable via an articulated door 36. The building structure 28 houses vehicle wash components, including a washing arrangement 40, a rinsing arrangement 44, and a drying arrangement 48. The scale and position of the vehicle wash components has been modified for ease of illustration. The washing arrangement 40 includes a set of position-controllable rotating wash brushes 52 that can be repositioned with at least one degree of freedom. The set of rotating wash brushes 52 are repositionable via one or more motors, hydraulics, or any other suitable means to accommodate for differently dimensioned and contoured vehicles. It is desirable to maintain the rotation axis RA of each of the rotating wash brushes 52 within a set distance range of an exterior surface of a vehicle determined by the effective washing radius range of the rotating wash brushes 52. Also included in the washing arrangement 40 is at least one washing fluid outlet for dispensing washing fluid onto a vehicle or the rotating wash brushes 52 that wash the vehicle.

The rinsing arrangement 44 includes one or more rinsing bars 56 or rinsing bar structures. The rinsing bars 56 have a set of rinsing fluid outlets for spraying jets of rinsing fluid on the exterior surface of a vehicle to wash away the washing fluid remaining on the vehicle after completion of the washing stage by the washing arrangement 40. As the jets of rinsing fluid quickly mist and lose their velocity over distance, the rinsing bars 56 are repositionable via one or more motors, hydraulics, or any other suitable means to maintain the rinsing bars 56 a within a desired distance range from the exterior surface of the vehicle to accommodate for differently dimensioned and contoured vehicles.

The drying arrangement 48 includes a set of air outlets 60 for directing airflow at and/or over the exterior surface of a vehicle to evaporate and/or urge the rinsing fluid off of the exterior surface. As directed airflows quickly diverge over distances, the air outlets 60 are repositionable via one or more motors, hydraulics, or any other suitable means to maintain the air outlets 60 within a desired distance range of the exterior surface of the vehicle.

A conveyor system 64 is housed in the building structure 28 and is positioned to receive a vehicle at ground level and urge the vehicle through a service line of the vehicle wash 20. The conveyor system 64 includes at least one endless belt 68 that is rotated by a drive roller 72 driven by a drive shaft of at least one drive motor 76. As will be understood, the at least one endless belt 68 can be a single endless belt spanning the lateral wheelbase of a range of vehicles, a pair of endless belts configured to be positioned under the front wheels of various vehicles, etc. The at least one endless belt 68 has a set of tire engagement ridges 80 along an outside surface thereof for more securely engaging a front wheel 84 of the vehicle 24 to urge a vehicle forward through the service line. In other embodiments, the conveyor system can translate vehicles via means other than an endless belt, such as an endless chain drive that impels one or more of the wheels along one lateral side of a vehicle.

The vehicle wash 20 includes a vehicle sensing system 88 for detecting the pose and at least one surface metric of a vehicle. In the present embodiment, the vehicle sensing system 88 includes a set of ultrasonic sensor modules 92 mounted on sensor columns 96. In particular, each of a first pair of sensor columns 96a is positioned on either lateral side of a driveway 100. A pair of ultrasonic sensor modules 92 is positioned on each of the pair of sensor columns 96a. A first ultrasonic sensor module 92a of the pair is positioned at a higher elevation than a second ultrasonic sensor module 92b of the pair. In addition, each of a second pair of sensor columns 96b is also positioned on either lateral side of the driveway 100 further towards the vehicle entrance 32, and has a pair of ultrasonic sensor modules 92a, 92b, like those of the sensor columns 96a. The ultrasonic sensor modules 92 include an ultrasonic beam transmitter and an ultrasonic sensor for sensing reflected ultrasonic beams from the ultrasonic beam transmitter.

The ultrasonic sensor modules 92 act as distance sensors for determining distances to objects positioned to intercept the ultrasonic beam. It will be appreciated that other types of distance sensor modules, such as infrared sensor modules and laser sensor modules, can be employed in some embodiments. The distance sensor modules can be sonic, optical, or any other suitable distance sensor module type.

The ultrasonic sensor modules 92 of each pair of sensor columns 96 face each other. As the vehicle 24 is driven between the sensor columns 96, the vehicle 24 intercepts the ultrasonic beams transmitted by the ultrasonic sensor modules 92 and reflects these ultrasonic beams. The ultrasonic sensors receive the reflected ultrasonic beams and can determine the distance between each of the ultrasonic sensor modules 92 and the vehicle 24. As will be appreciated, as the vehicle 24 is driven past the sensor columns 96, the upper ultrasonic sensor modules 92a can detect reflection of the ultrasonic beams differently than the lower ultrasonic sensor modules 92b, as the vehicle 24 may only intercept ultrasonic beams from one of the upper ultrasonic sensor modules 92a and the lower ultrasonic sensor modules 92b at times, and at other times both. As the vehicle 24 is driven past the sensor columns 96a, 96b, the ultrasonic sensor modules 92 continuously register reflected ultrasound beams to determine the width of the vehicle 24 between each pair of ultrasonic sensor modules 92. The ultrasonic sensor modules 92 also continuously determine the lateral position of the vehicle 24 between the sensor columns 96 based on differences between the detected distances between the vehicle 24 and the ultrasound sensor modules 92, as well as the orientation of the vehicle 24 based on differences between the measurements between subsequent pairs of sensor columns 96.

The ultrasonic sensor modules 92 thus enable the determination of vehicle pose, position, and dimensions. Other types of sensors, such as other sonic sensors, optical sensors such as imaging sensors, time-of-flight sensors, can be employed in place of the ultrasonic sensor modules 92.

The vehicle sensing system 88 also includes at least one imaging sensor module in the form of a video camera 104. The video camera 104 can be any suitable imaging device for registering one or more images of a front of a vehicle as it approaches the vehicle entrance 32. The video camera 104 is positioned atop of the vehicle entrance 32 and oriented to look at an angle downwards towards approaching vehicles. In this position, images captured by the video camera 104 can assist in determining the position of the vehicle 24 and whether the vehicle 24 is advancing. Further, a vehicle surface map of the vehicle 24 can be at least partially generated from the image(s) captured by the video camera 104. In some scenarios, the video camera 104 can be configured to capture images to be presented on a display as will be described.

In other embodiments, one or more imaging sensor modules (such as video or photo cameras) can be employed to image a vehicle as it approaches the vehicle entrance 32. Where two or more imaging sensor modules are employed, the imaging sensor modules can be positioned and/or oriented to capture images of a vehicle that enable more comprehensive pose data and vehicle surface map data to be registered. The imaging sensor modules can employ any kind of suitable optical wavelength and may also include at least one illumination source. For example, in one embodiment, the image sensor modules include an infrared LED for illuminating a subject area, and an infrared light sensor for capturing reflected infrared light to image a vehicle as it approaches the vehicle wash 20.

Above the video camera 104 are mounted a set of three displays 108 that form part of a vehicle guidance system. The displays 108 can be any type of display for presenting feedback information to a driver of the vehicle 24. Preferably, the displays 108 have a glare mitigating layer for reducing glare when being viewed outside by a driver of a vehicle. For example, in the illustrated embodiment, the displays 108 are a set of LCD panel displays, but may alternatively be a single display panel, a string of LEDs, or any other suitable visual output device.

Figure 2:
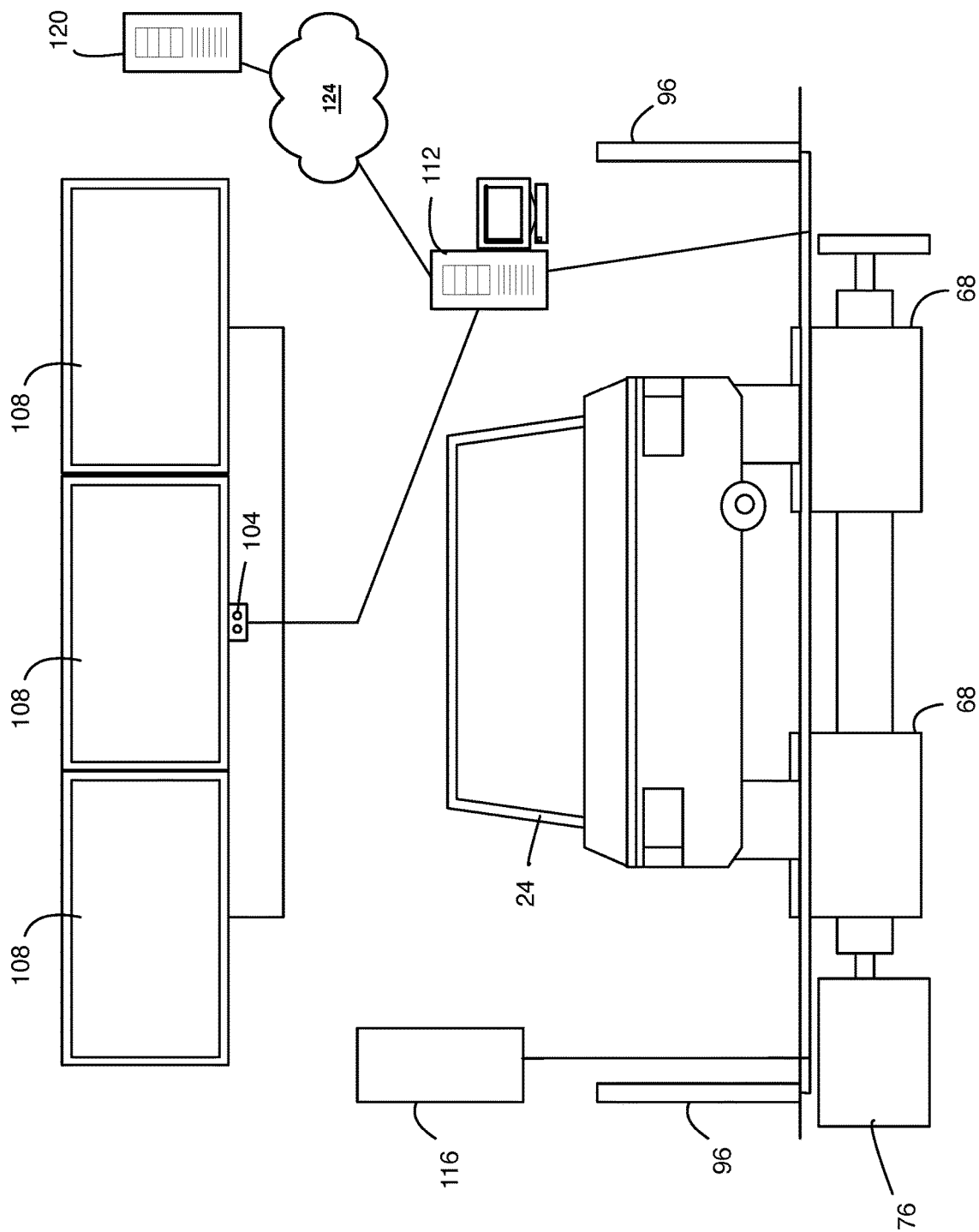
FIG. 2 is a schematic diagram of a number of components of the vehicle wash of FIG. 1.

Now referring to FIGS. 1 and 2, a computer system 112 is shown being coupled to the ultrasound sensor modules 92 of the sensor columns 96, the video camera 104, the displays 108, the drive motor(s) 76 driving the endless belts 68, and repositioning motors 116 for the washing arrangement 40, the rinsing arrangement 44, and the drying arrangement 48. The computer system 112 forms part of the vehicle sensing system 88 and the vehicle guidance system. Vehicle metrics data are received by the computer system 112 from the ultrasonic sensor modules 92 and image data from the video camera 104, which then presents processed images generated from images of the vehicle 24 captured via the video camera 104, and at least partially controls the drive motor(s) 76 driving the endless belts 68 and the repositioning motors for the washing arrangement, the rinsing arrangement 44, and the drying arrangement 48.

The computer system 112 is also in communication with a remote server 120 via a computer communications network 124.

Figure 3:
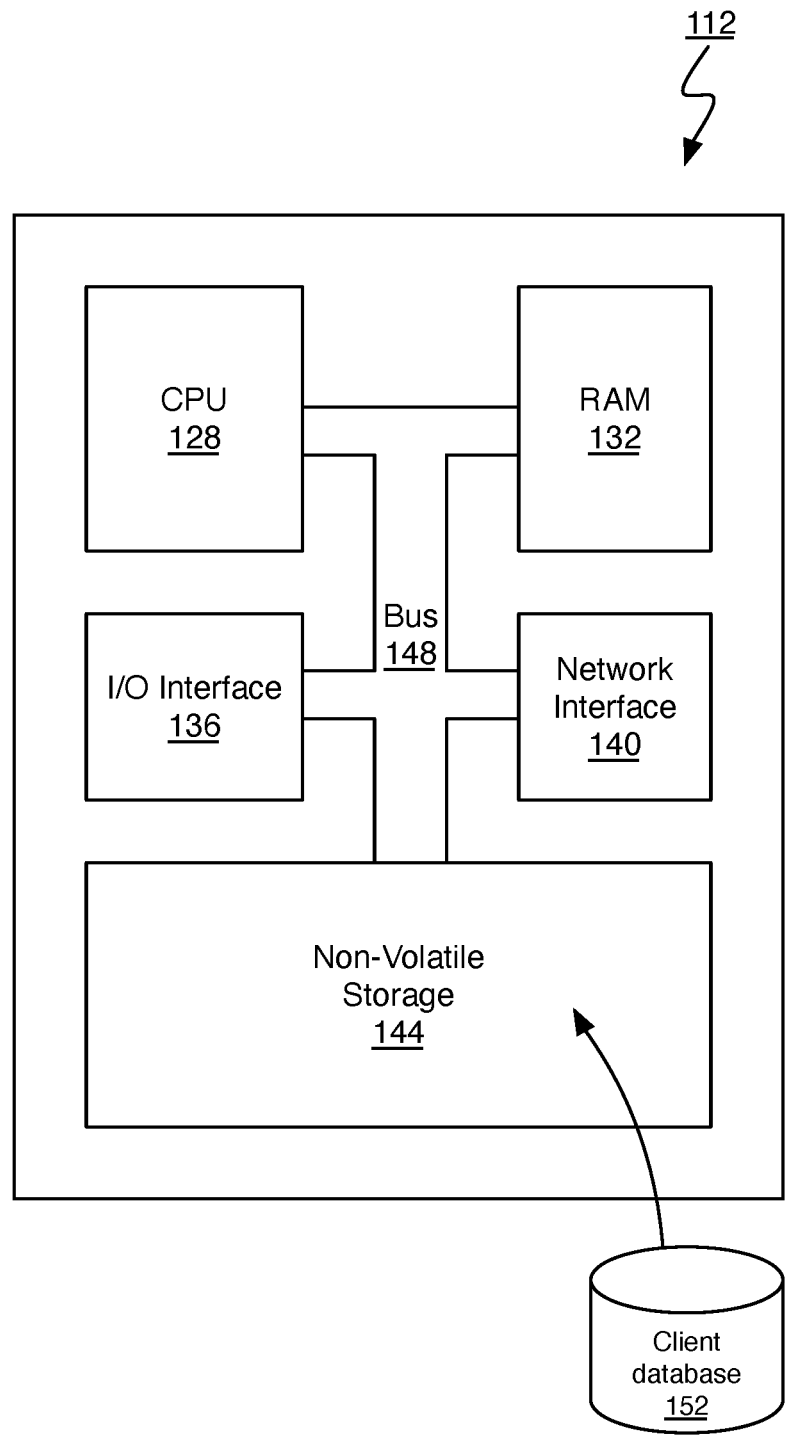
FIG. 3 is a schematic diagram of various physical and logical components of a computer system of the vehicle wash of FIG. 2.

FIG. 3 shows various physical elements of the computer system 112. As shown, computer system 112 has a number of physical and logical components, including a central processing unit ("CPU") 128, random access memory ("RAM") 132, an input/output ("I/O") interface 136, a network interface 140, non-volatile storage 144, and a local bus 148 enabling CPU 128 to communicate with the other components. CPU 128 executes at least an operating system, and a vehicle intake system. RAM 132 provides relatively responsive volatile storage to CPU 128. The I/O interface 136 allows for input, including sensor data, to be received from one or more devices, such as the ultrasound sensor modules 92 and the video camera 104, and outputs information to output devices, such as the displays 108, the drive motor(s) 76, and the repositioning motors 116. Network interface 140 permits communication with other computing devices, such as the remote server 120, over computer networks such as the computer communications network 124 (for example, the Internet). Non-volatile storage 144 stores the operating system and programs, including computer-executable instructions for implementing the vehicle intake system. During operation of the computer system 112, the operating system, the programs and the data may be retrieved from non-volatile storage 144 and placed in RAM 132 to facilitate execution.

A client database 152 stores data for a plurality of clients of the vehicle wash 20, including one or more identifiers unique to a client, any credit(s) available to the client, a vehicle model, and a vehicle surface map as will be described below. The data in the client database 152 can be at least partially hashed and/or encrypted to prevent unauthorized access.

The computer system 112 is calibrated with the ultrasonic sensor modules 92 and the video camera 104 during a set up process to ensure that the data captured by the ultrasonic sensor modules 92 and the video camera 104 is correctly interpreted. Further, the computer system 112 is also calibrated with the repositioning motors 116 to ensure accurate positioning of the rotating wash brushes 52, the rinsing bars 56, and the air outlets 60.

Figure 4:
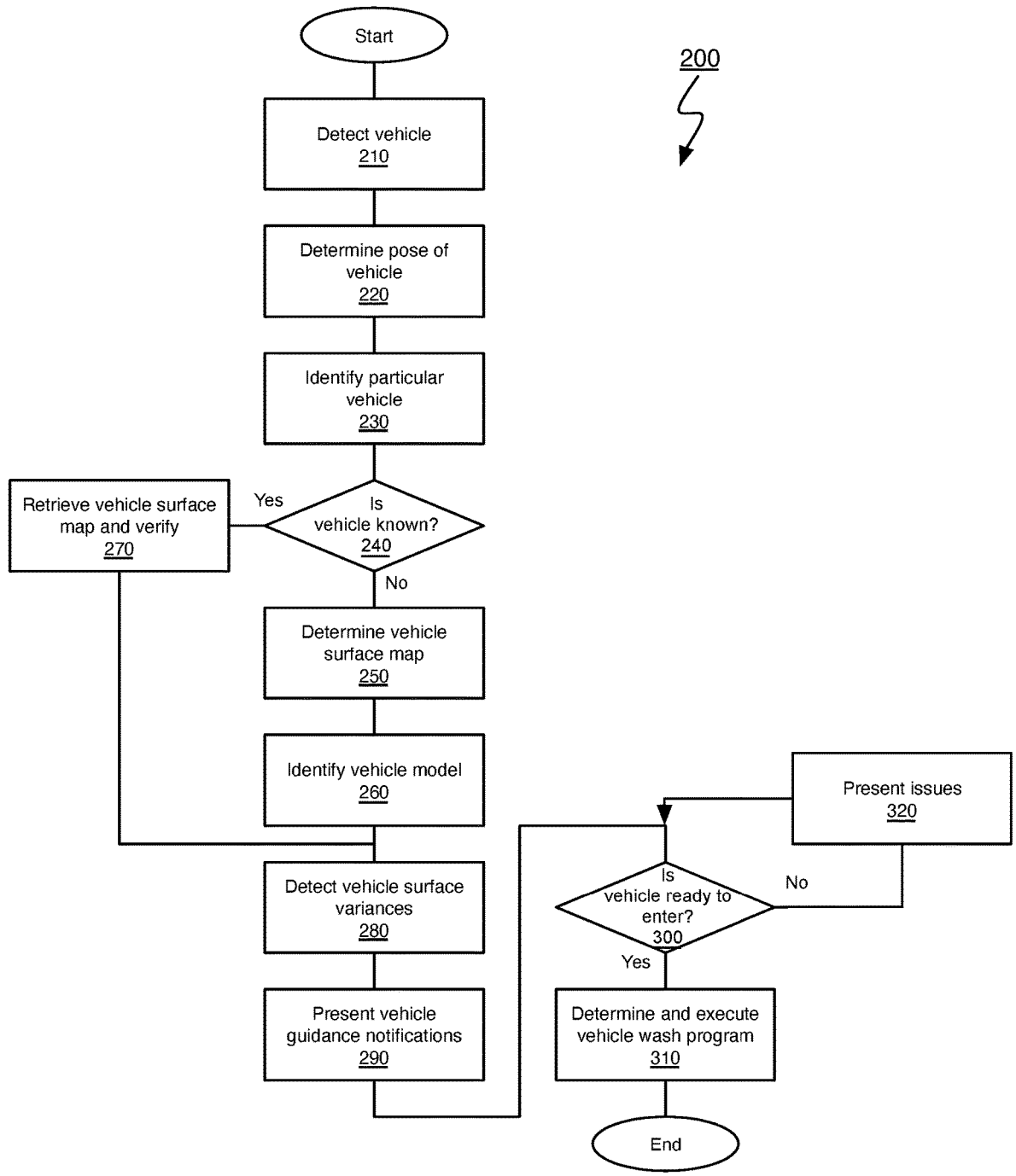
FIG. 4 is a flow chart of the general method of operation of the vehicle wash of FIGS. 1 and 2.

The method 200 of operating the vehicle wash 20 having the vehicle sensing system 88 via the computer system 112 will now be discussed with reference to FIGS. 1, 2, and 4. The method 200 commences with the detection of a vehicle (210). The ultrasonic sensor modules 92 are constantly monitoring reflections of the ultrasound beams transmitted. When a reflections of the ultrasonic beams detected by at least one of the ultrasonic sensor modules 92 of each of a pair of sensor columns 96 indicate a travel time within a certain time range, the computer system 112 deems that a vehicle is positioned between the sensor columns 96.

Additionally or alternatively, a vehicle can be detected using one or more images from the video camera 104.

Once a vehicle is detected, the pose of the vehicle is determined (220). Vehicle pose refers to the position and orientation of the vehicle, and is determined from sensor data captured by the vehicle sensing system 88. Sensor data includes distance metrics for the vehicle determined and communicated by the ultrasonic sensor modules 92 and image data from the video camera 104. Using the distances detected from the vehicle 24 by each ultrasonic sensor module 92 and the images captured by the video camera 104, the pose of the vehicle 24 can be determined. The images from the video camera 104 can be processed to identify a vehicle and determine at least its position. The sensor data from the ultrasonic sensor modules 92 can be used to determine the orientation of the vehicle 24. The sensor data is received by the computer system 112 and processed by the vehicle intake system being executed thereon. In combination, the sensor data from the ultrasonic sensor modules 92 and the video camera 104 are used by the vehicle intake system to determine the pose (that is, the position and orientation) of the vehicle 24.

The images from the video camera 104 are then analyzed to identify the particular vehicle (230). More specifically, a vehicle license plate or other uniquely identifier on the vehicle is identified. Recognition is then performed on the identifier. For example, in the case of a license plate, optical character recognition can be used to process the portion of the image(s) from the video camera 104 to read the license plate. Additionally or alternatively, an identifier may be provided by RFID or some other means via a separate reader. For example, a driver may tap a card on a card reader positioned alongside the driveway 100, an identifier of a signal from a mobile device associated with a vehicle (such as a smartphone operated by the driver of the vehicle 24) can be used to uniquely identify the vehicle, Once the identifier is retrieved for the vehicle 24, the identifier is searched for in a database of known identifiers for vehicles (240).

If the identifier is unknown, the vehicle intake system generates a vehicle surface map for the vehicle 24 (250). As the vehicle 24 is driven towards the vehicle entrance 32, the vehicle 24 passes and is, in effect, measured by the ultrasonic sensor modules 92. Using the pose of the vehicle 24 as determined by the ultrasonic sensor data and/or the images from the video camera 104, the ultrasonic sensor data can be further processed to generate a vehicle surface map. The vehicle surface map is a collection of points along an exterior surface of the vehicle 24. The vehicle surface map can be augmented or generated from the images from the video camera 104.

Additionally or alternatively, sensor data is analyzed either by the computer system 112 or is transmitted remotely to the remote server 120 to identify the model of the vehicle 24 (260). Where the identification is performed by the remote server 120, the sensor data can be communicated to the remote server 120 for analysis. Either the computer system 112 or the remote server 120 compares the collected sensor data against metrics for a plurality of known vehicle models to determine a closest match. Upon determining the model type for the vehicle 24, a vehicle surface map may be retrieved from a database either stored by the computer system 112 or the remote server 120. ALT: IMAGE(S)

Additionally to the determination of a vehicle surface map at 250 and the identification of a vehicle model at 260, model identification can be determined via identification of model identifiers in one or more images of the vehicle 24. For example, a logo on the front of the vehicle 24 can be used to determine a brand, thus enabling filtering of a vehicle database to determine the particular model.

The vehicle surface map and the vehicle model are then saved in the client database 152.

If, instead, the vehicle intake system executing on the computer system 112 determines that the vehicle identifier matches an existing record in the client database 152, the vehicle surface map and the vehicle model is retrieved. The vehicle surface map and vehicle model can be quickly verified using the same or a simplified version of the approach used during 250 and 260 described above.

Once the vehicle surface map and the vehicle model have been retrieved, the sensor data is further analyzed to determine if there are external vehicle surface variances (280). The computer system 112 and/or the remote server 120 can analyze the sensor data (that is, the metrics collected via the ultrasonic sensor modules 92 and the images captured by the video camera 104) to determine if there are variances that may impact the vehicle surface map and the suitability of the vehicle for washing via the vehicle wash 20. Variances can include, for example, bike or ski racks, including bikes and/or skis, luggage racks, cargo bins, trailers, etc. In addition, variances can also include open windows, open sunroofs, and absent vehicle tops, in the case of convertibles. These variances are included as part of the vehicle surface map.

Using the pose determined at 220, vehicle guidance notifications are presented to a driver of the vehicle 24 (290).

Figure 5:
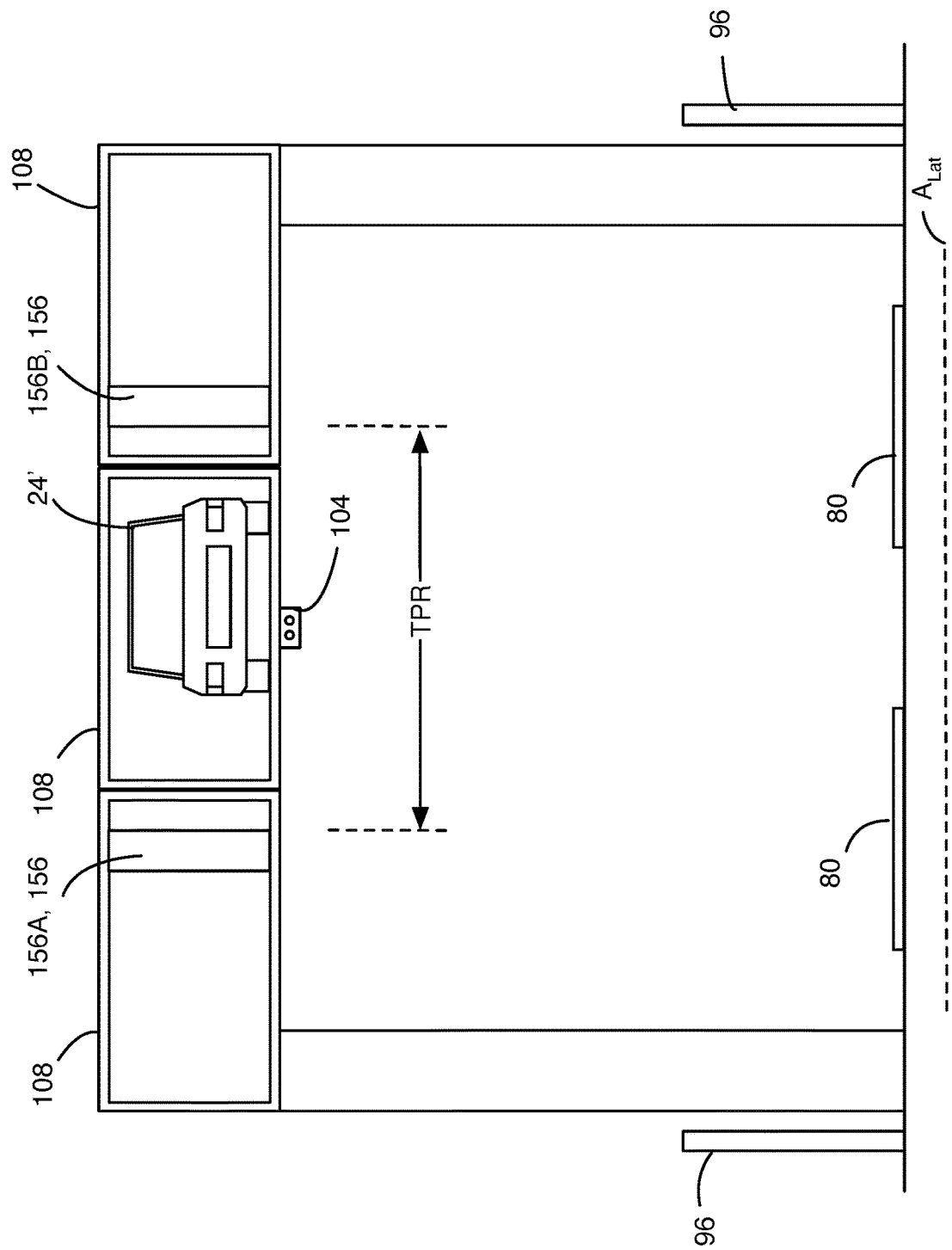
FIG. 5 is a front view of the vehicle wash of FIG. 1.

FIG. 5 shows a simplified view of the building structure 28 and vehicle entrance 32 of the vehicle wash 20 as would be viewed by a driver of the vehicle 24. The displays 108 are positioned atop of the vehicle entrance 32 so as to be readily visible and not obstruct a driver's view or deter from the driver's ability to operate the vehicle 24. An image 24' of the vehicle 24 is presented on the displays 108. The image 24' is reversed so that it is a mirror image of the image of the vehicle 24 captured by the video camera 104.

The vehicle guidance notifications include vehicle positioning markers in the form of two visual guide bars 156A, 156B (collectively referred to as visual guide bars 156) which are also presented on the displays 108 and represent a target position range TPR along a lateral axis $A_{Lat}$ normal to a vehicle travel direction VTD through the vehicle wash 20. Positioning of a vehicle image 24' representing the vehicle 24 within the target position range TRP reduces the risk of misalignment with conveyor means and/or washing equipment within the vehicle wash 20. The visual guide bars 156 can be green when the vehicle is deemed to be safely within the lateral limits, and may be presented in yellow as the vehicle 24 approaches these lateral limits.

Figure 6B:
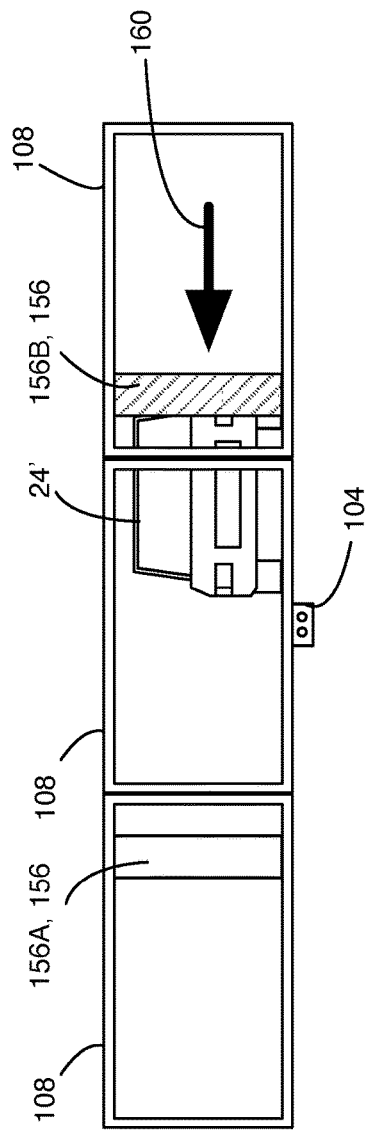
FIG. 6B shows a display of the vehicle wash presenting visual feedback to a driver of the vehicle of FIG. 6A.
Figure 6A:
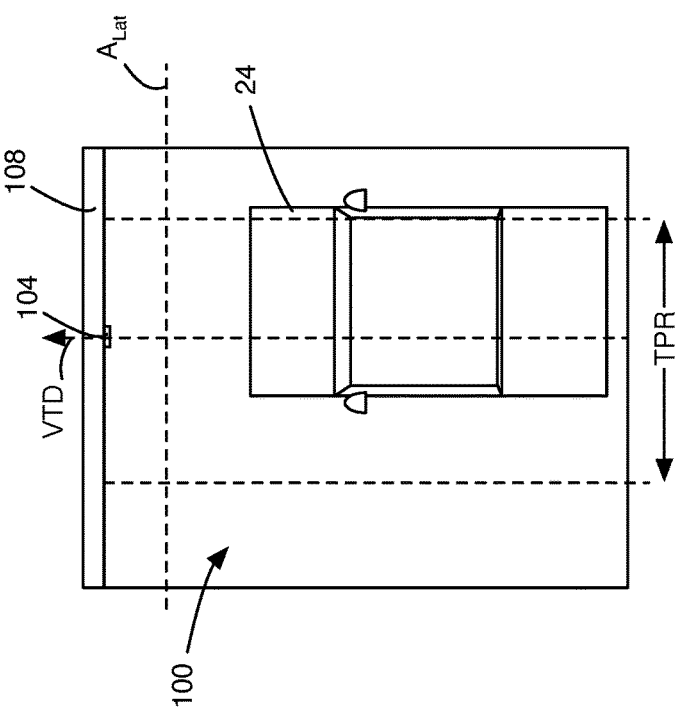
FIG. 6A shows a plan view of a vehicle approaching the vehicle wash of FIGS. 1 and 2.

FIG. 6A shows a top view of the vehicle 24 when positioned to a right lateral side of the driveway 100. If the vehicle 24 is driven straight from this position and orientation, the wheels of the vehicle 24 would not satisfactorily align with the endless belts 68 of the conveyor system 64. Accordingly, the corresponding view presented on the displays 108 in FIG. 6B show that the vehicle image 24' is impinging upon the right visual guide bar 156B, which has been turned red to alert the driver of the criticality of the pose of the vehicle 24. In addition, vehicle positioning signal in the form of a guidance arrow 160 in red is also shown adjacent the right visual guide bar 156B to direct the driver to move the vehicle 24 left within the driveway 100.

Figure 7B:
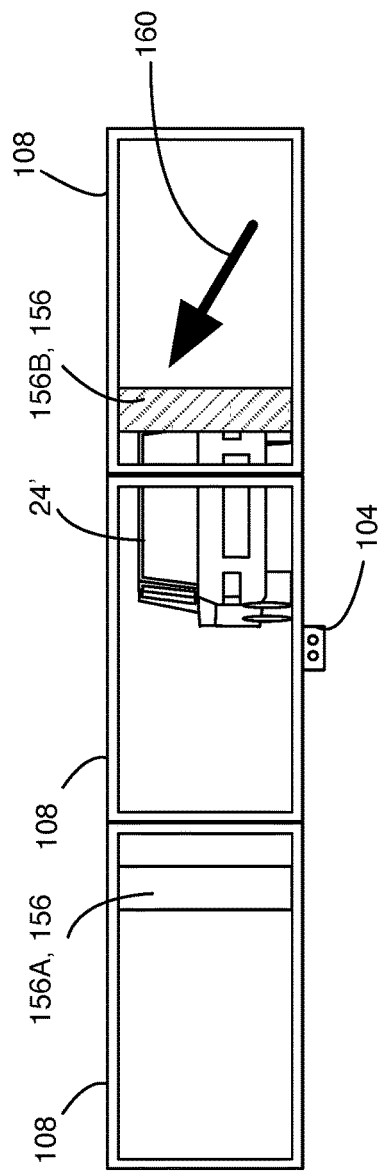
FIG. 7B shows the display of the vehicle wash presenting visual feedback to a driver of the vehicle of FIG. 7A.
Figure 7A:
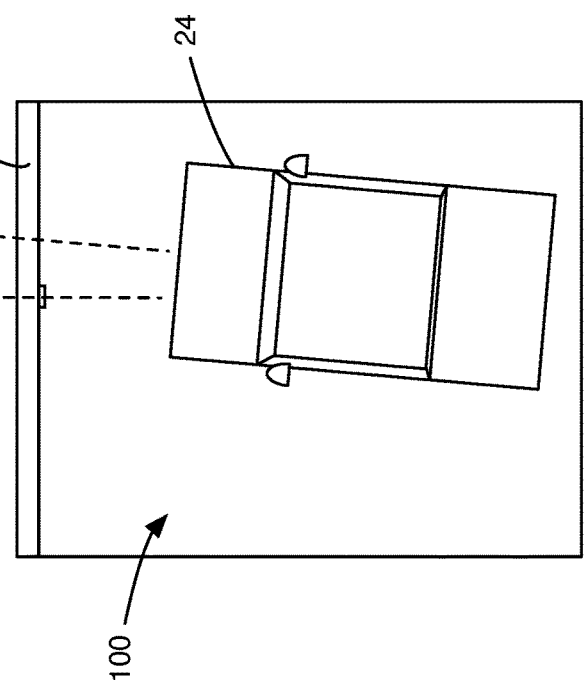
FIG. 7A shows a plan view of another vehicle approaching the vehicle wash of FIGS. 1 and 2.

FIG. 7A shows a top view of the vehicle 24 when positioned to a right lateral side of the driveway 100 and oriented off-centre; that is, with a longitudinal axis LAv of the vehicle 24 oblique to a longitudinal axis LAsl of the service line of the vehicle wash 20. If the vehicle 24 is driven straight from this position and orientation, the wheels of the vehicle 24 would not satisfactorily alight with the endless belts 68 of the conveyor system 64 and, in fact, the vehicle 24 may drive into the building structure 28. Accordingly, the corresponding view presented on the displays 108 in FIG. 7B show that the vehicle image 24' is impinging upon the right visual guide bar 156B, which has been turned red to alert the driver of the criticality of the pose of the vehicle 24. In addition, the guidance arrow 160 in red is also shown adjacent the right visual guide bar 156B to direct the driver to turn the vehicle 24 to the left and move the vehicle to the left within the driveway 100.

Returning again to FIG. 4, the computer system 112 determines if the vehicle is ready to enter the vehicle wash 20 (300). If the vehicle is free of fail conditions, such as unsatisfactory positioning or having a bike unsafely mounted atop of a bike rack on the roof, the computer system 112 determines and executes a vehicle wash program (310). The vehicle wash program includes the operation of the drive motor(s) 76, and a movement pattern for the washer arrangement 40, the rinsing arrangement 44, and the drying arrangement 48. That is, the shaping of the washer arrangement 40, the rinsing arrangement 44, and the drying arrangement 48 can be predetermined prior to commencement of the vehicle wash via the computer system 112.

If the vehicle 24 is not deemed ready to enter the vehicle wash 20, the issues can be presented via the displays 108 and an audio system (not shown) (320). For example, the vehicle 24 may be deemed to be unready to enter the vehicle wash 20 if the vehicle surface variances identified at 280 of the vehicle surface map require driver attention or indicate that the vehicle 24 is unsuitable for washing in the vehicle wash 20. For example, if the images captured by the video camera 104 indicate the sun roof is open or that a bike positioned in a rack atop of the vehicle 24 is too tall for safe operation of the vehicle wash 20, or if the metrics determined via the ultrasonic sensor modules 92 suggest that a window is open, a corresponding message can be presented to the driver via the displays 108, such as "Please ensure sun roof is closed", or "Cannot enter with bike on rack". Further, where the vehicle 24 is outside of a suitable position range for entry into the vehicle wash 20, the displays 108 may indicate so and an audio alert may be sounded to notify the driver.

By use of the vehicle sensing system 88 to automatically guide a driver in positioning and orienting a vehicle for safe entry into the vehicle wash 20, and by automatically alerting the driver of safety risks related to the vehicle wash 20 when approaching the vehicle wash 20, the vehicle wash 20 can generally be operated unattended.

In the above described embodiments, the vehicle wash includes a set of distance sensor modules and an imaging sensor module in the form of a video camera, and while both the set of distance sensors and the video camera are employed to detect the pose of a vehicle and generate a vehicle surface map. In other embodiments, however, the vehicle wash can include other configurations of sensors, including, for example, only a set of one or more distance sensors, only a set of one or more imaging sensors, other types of sensors, or any combination thereof. Further, each of the pose detection and the vehicle surface map generation can be performed by only a set of one or more distance sensors, only a set of one or more imaging sensors, other types of sensors, or any combination thereof. In some embodiments, distance sensors can be used to generate a vehicle surface map and one or more imaging sensors can be used to determine a vehicle pose.

Further, in other embodiments, the pose and a surface map of the vehicle can be determined using a single imaging sensor module.

Figure 8:
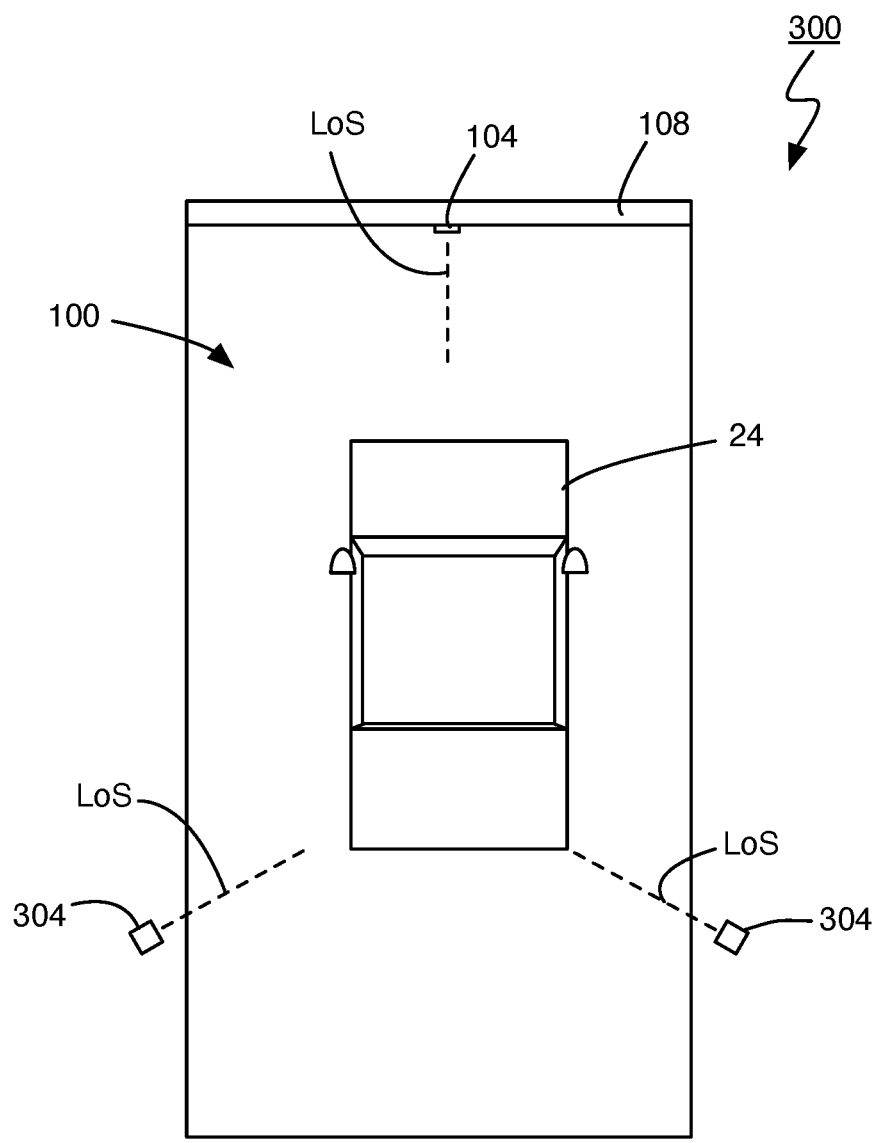
FIG. 8 shows a vehicle sensing system in accordance with another embodiment, wherein three imaging cameras are employed.

FIG. 8 shows a vehicle sensing system 300 that is similar to the embodiment illustrated in FIGS. 1 to 7, wherein the distance sensor modules are replaced with two additional image sensors in the form of two rear video camera 304. The two rear video cameras 304 are each positioned on a lateral side of the driveway 100 to view a rear and side of the vehicle 24 as it approaches the vehicle wash. The rear video cameras 304 can be spaced sufficiently from the building structure to enable imaging of the rear and lateral sides of a variety of vehicle shapes and sizes prior to their arrival at the entrance of the building structure and the washing, rinsing, and drying arrangements therein. In the particular illustrated embodiment, the video cameras 104, 304 have lines of sight ("LoS") that are directed at the vehicle 24 at about 120 degrees relative to one another. Positioning at least one imaging sensor to image a rear of a vehicle as it approaches the vehicle wash can enable identification of the particular vehicle in regions where only rear license plates are required for a vehicle. In other embodiments, the number of imaging devices and their positions and orientations can be varied.

The sensor modules can be reorientable and or repositionable to enable them to capture more data than statically positioned and oriented sensor modules. For example, distance sensor modules can be repositionable along an elevational axis of a sensor column to enable the distance sensor module to detect an elevational profile of a vehicle positioned in front thereof.

The displays 108 can also be used to present information that is or may be of interest to the driver of the vehicle 24. For example, where the vehicle wash 20 uses a credit system for vehicle washes, a visual indicator of the number of washes remaining in credit can be presented. Further, one or more promotions and advertisements can be presented to the driver via the displays 108. The promotions and/or advertisements can be selected based on the purchase history of the driver, the model of the vehicle 24, etc.

Figure 9A:
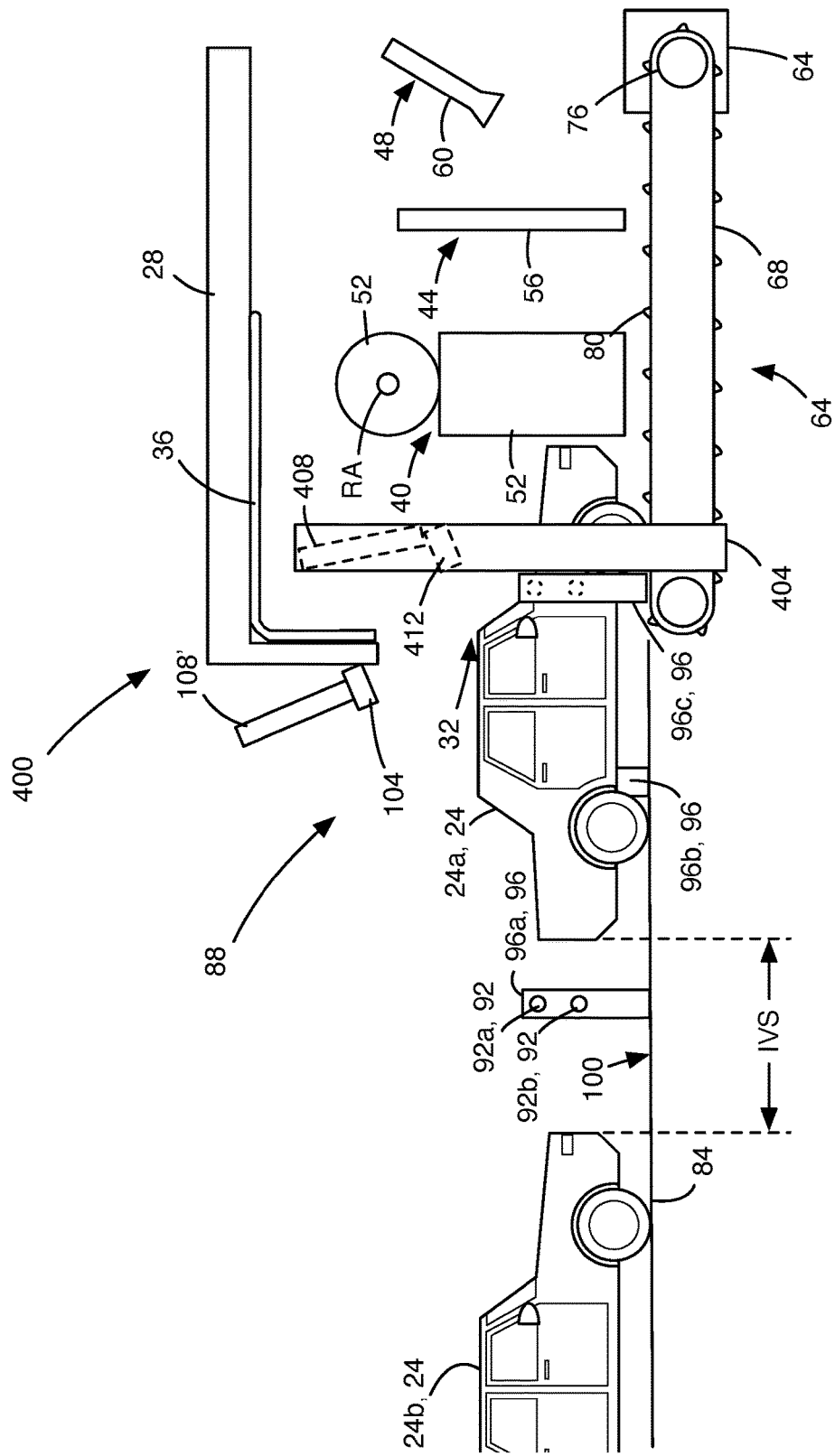
FIG. 9A is a side schematic diagram of a vehicle wash using a vehicle sensing system similar to that of FIG. 1 in accordance with another embodiment.
Figure 9B:
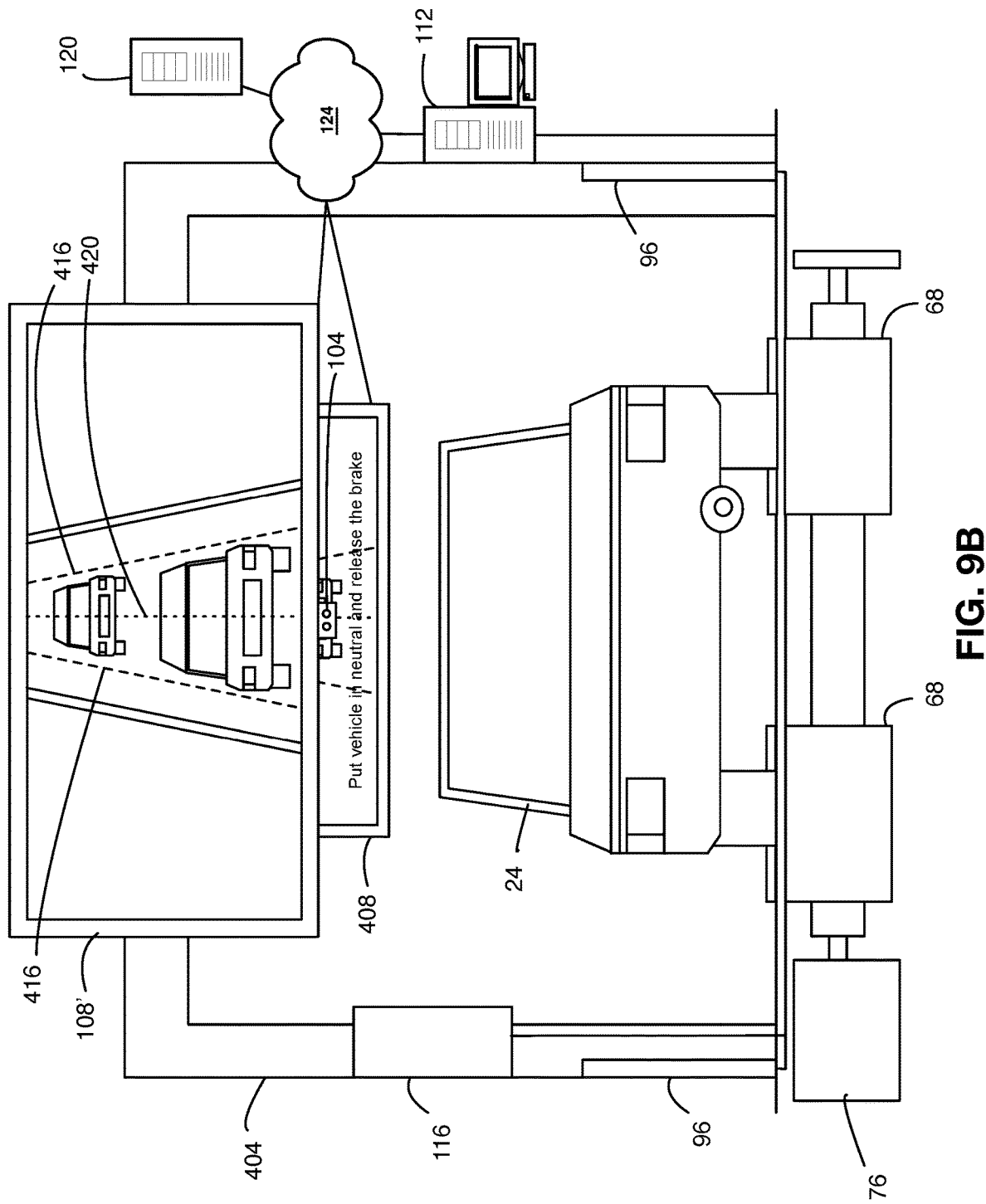
FIG. 9B is a schematic diagram of a number of components of the vehicle wash of FIG. 9A.

FIGS. 9A and 9B show a vehicle wash 400 for vehicles 24a, 24b (alternatively, collectively referred to hereinafter as vehicles 24) in accordance with another embodiment. As will be understood, the components and their relative positioning in FIG. 9 may not be illustrated to scale. The vehicle wash 400 is similar to the vehicle wash 20 of FIG. 1 with a number of modifications. In particular, the vehicle wash 400 includes an entry arch 404 positioned within the vehicle wash 400 and positioned to arch over vehicles travelling through the vehicle wash 400. A display 408 is mounted on the entry arch 404. The display 408 can be any type of suitable display for presenting images to a driver of the vehicle 24. Like the display 108', the display 408 is also connected to the computer system 112 for displaying vehicle positioning notifications. An imaging sensor device in the form of a camera 412 is also mounted on the entry arch 404 to image vehicles 24 as they enter the vehicle wash 400. Images captured by the camera 412 are transmitted to the computer system 112 for analysis.

The first car 24a and the second car 24b are separate by an inter-vehicle space IVS. In order to operate the vehicle wash 400 more efficiently, it can be desirable to reduce the inter-vehicle space IVS while still maintaining a minimum target distance of three feet between vehicles 24. The minimum target distance is at least partially based on the space needed for wash brushes 52 to get between the vehicles 24 to wash their front and rear surfaces. During high-traffic periods, it can be desirable to set the target distance between cars to the minimum target distance. At other times, however, it can be desirable to increase the target distance to provide more space between vehicles and thus reduce the risk of contact between vehicles. This target distance can thus be dynamically set at least partially based on the volume of traffic, human input, weather conditions, etc.

FIG. 9B shows the elements of the vehicle wash 400 as vehicles 24 are driving in. The external display 108' shows images captured by the camera 104 after processing by the computer system 112. A pair of vehicle positioning markers 416 are shown. The vehicle positioning markers 416 provide lateral edges that extend parallel to the vehicle travel direction through the vehicle wash 400. The vehicle positioning markers 416 define a target position range between them within which vehicles are aligned to mount onto the conveyor means of the vehicle wash 400. In addition, another vehicle positioning marker 416 in the form of a median line extends parallel to the vehicle travel direction through the vehicle wash 400 and provides a visual cue to drivers of the vehicles 24.

The internal display 408 presents similar images to those displayed by the external display 108', but captured via the camera 412. In addition, the computer system 112 presents instructions to drivers of the vehicles that correspond to the position of their vehicle in the vehicle wash 400. Traditionally, these instructions are presented at a side of the travel path of vehicles through a vehicle wash, but by placing the display above the travel path, a driver, when reading information on the display, is more likely to notice unexpected movement, such as backwards travel, of the preceding vehicle and thus better able to prevent contact with the preceding vehicle.

Figure 10A:
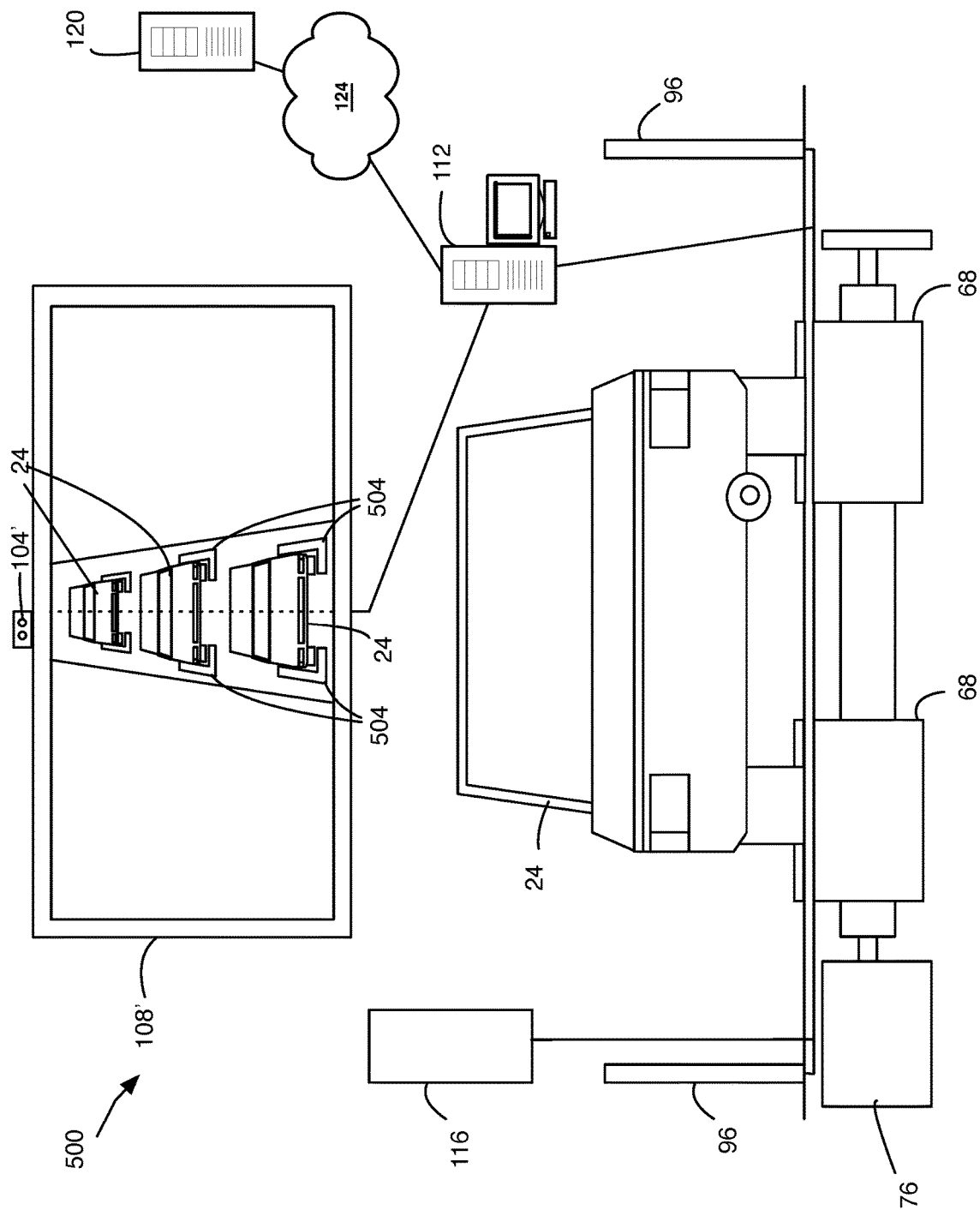
FIG. 10A shows a first image presented by a display of a vehicle sensing system of a vehicle wash in accordance with a further embodiment.
Figure 10B:
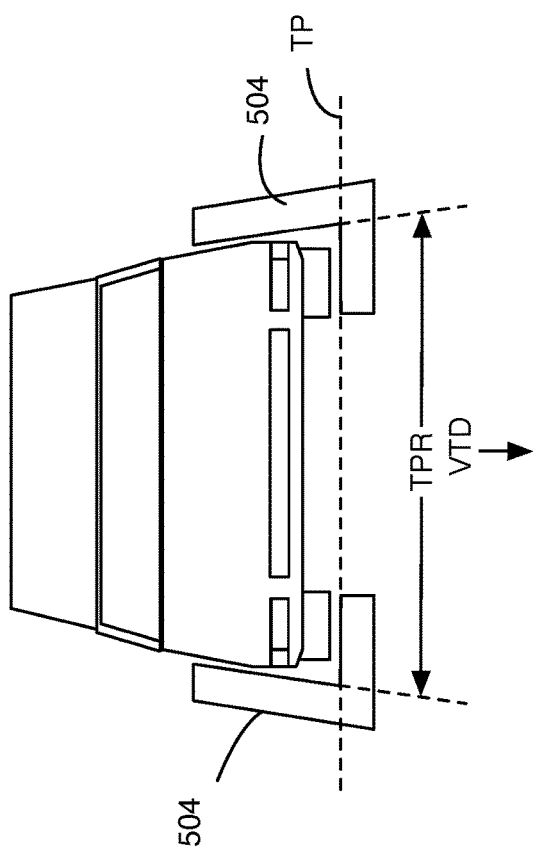
FIG. 10B shows a second image presented on the display of the vehicle sensing system of the vehicle wash of FIG. 10A.

FIG. 10A shows a vehicle wash 500 in accordance with a further embodiment. The vehicle wash 500 is similar to that of FIG. 1. In this embodiment, the computer system 112 processes images captured by the camera 104' and, along with the sensor data, identifies the pose of the vehicles 24 via any known approach, such as by determining bounding polygons for each vehicle. The computer system 112 then inserts vehicle positioning markers in the form of corner bounds 504 and directs the display 108' to present the composite images.

The corner bounds 504 have lateral edges that define a target position range TPR along a lateral axis normal to the vehicle travel direction VTD through the vehicle wash 500. In addition, the corner bounds 504 have longitudinal edges that define a target position TP along a longitudinal axis parallel to the vehicle travel direction VTD through the vehicle wash 500.

The corner bounds 504 indicate to drivers of the vehicles 24 how to position their vehicles 24 in order to align their vehicles 24 to mount the conveyor means of the vehicle wash 24. In addition, the corner bounds 504 also prompt drivers of the vehicles 24 to maintain a target distance between the vehicles 24. The target distance for a second vehicle 24 is set at least to a minimum target distance from a rear of a first vehicle 24. As the vehicles 24 move forward and enter the vehicle wash 500, the corner bounds 504 move forward (in this case, downwards on the display 108') to give a visual indicator of how to operate the vehicle 24 being driven.

Figure 10C:
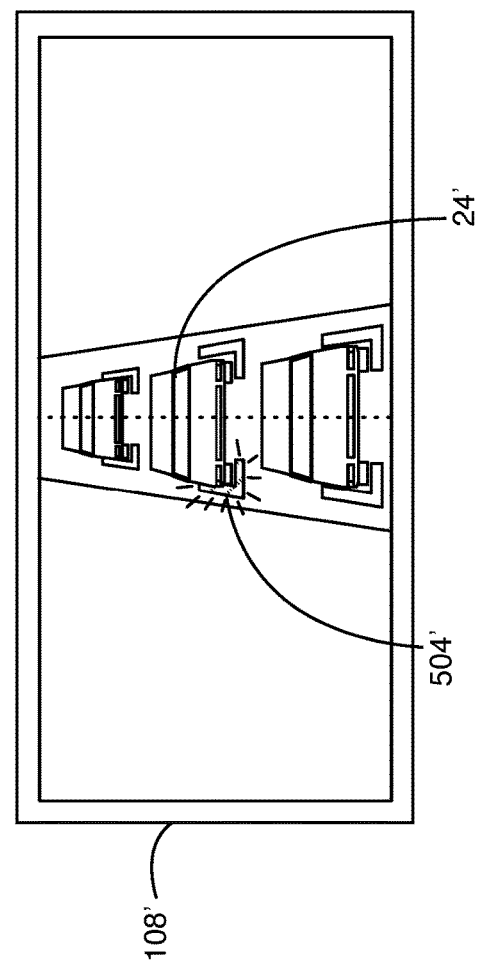
FIG. 10C shows a display presenting a third image of the vehicle sensing system of the car wash of FIG. 10A.

FIG. 10C shows a corner bound 504' when the corresponding vehicle 24' veers outside of the target position range and onto the corner bound 504'. The corner bound 504' flashes on the display 108' and turns yellow, orange, or red, depending on how far outside of the target position range the vehicle 24' has veered.

Figure 11C:
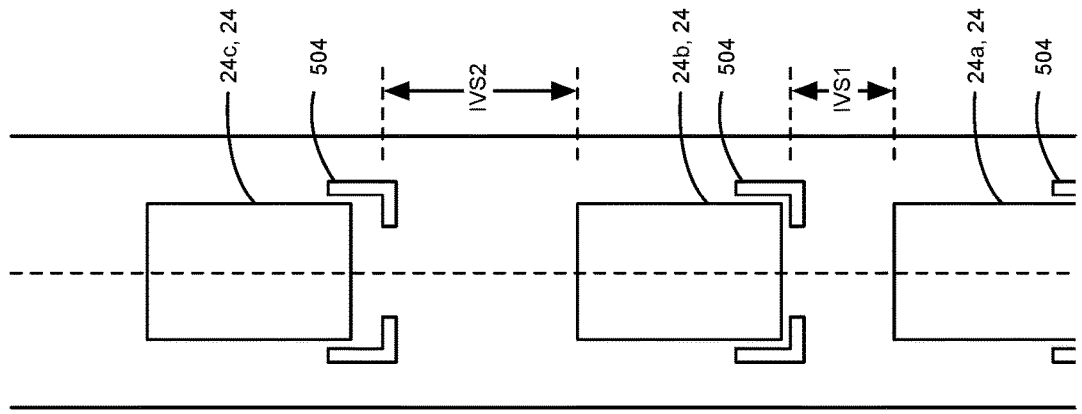
FIGS. 11A to 11C show schematic diagrams of the determination of target position ranges using the vehicle sensing system of FIGS. 10A and 10B.
Figure 11B:
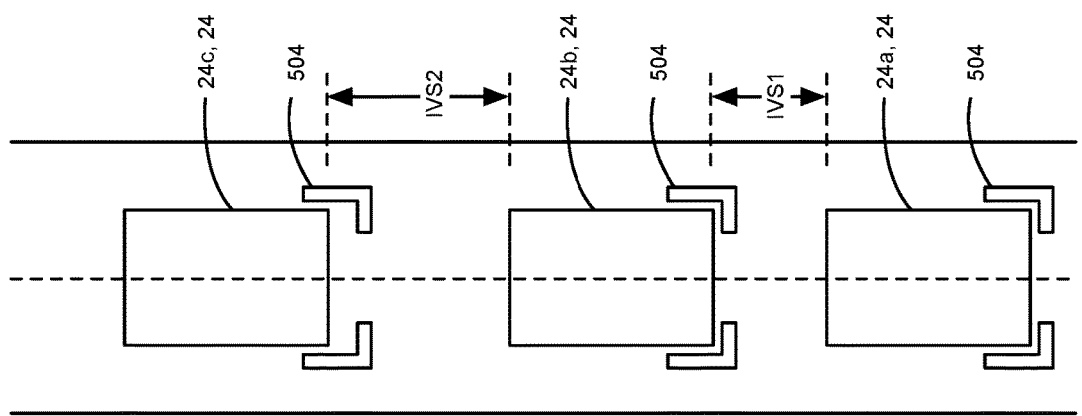
Figure 11A:
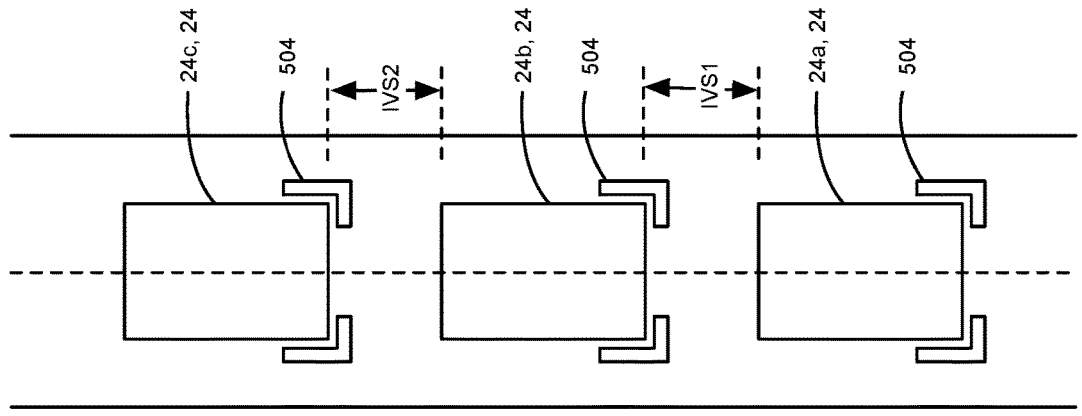

FIG. 11A shows a top view of a set of vehicles positioned along a drive leading to the vehicle wash 500. The computer system determines a target distance between vehicles and sets the position of the corner bounds 504 in the image accordingly. As shown, the distance between the rear of the first vehicle 24a and the longitudinal interior edge of the corner bounds 504 of the next vehicle 24b is set to a target distance. Similarly, the distance between the rear of the second vehicle 24b and the longitudinal interior edge of the corner bounds 504 of the next vehicle 24c is set to a target distance. In the illustrated example, the inter-vehicle spacing IVS1 between the first vehicle 24a and the second vehicle 24b and the inter-vehicle spacing IVS2 between the second vehicle 24b and the third vehicle 24c is just longer than the target distance.

FIG. 11B shows the position of the vehicles 24a, 24b, and 24c after the vehicles 24a and 24b move forward with the corner bounds 504. The corner bounds 504 are preferably moved at the same speed as the conveyor system used in the vehicle wash. For example, where a belt is used to convey vehicles through the vehicle wash, the vehicle positioning markers can be moved, when safe, at the same speed as the belt. The third vehicle 24c does not accelerate sufficiently to keep pace with movement of the corresponding corner bounds 504. As a result, the corner bound 504 corresponding to the third vehicle 24c shifts ahead of the vehicle 24c.

FIG. 11C shows the position of the vehicles 24a, 24b, and 24c after the vehicles 24a and 24b continue to move forward with the corner bounds 504. The third vehicle 24c has commenced to move forward, but is still lagging behind movement of the corresponding corner bounds 504. The computer system 112 tracks movement of the vehicle 24c. It may be unwise to direct the driver of the third vehicle 24c to accelerate to catch up to the corner bounds 504, as the driver may accelerate too much and approach the second vehicle 24b with too much speed. In recognition of this risk, the computer system 112 bases the position of the corresponding corner bounds 504 at least partially on the position and/or acceleration of the third vehicle 24c in order to gently bring the third vehicle 24c back to the target distance from the second vehicle 24b.

Figure 12:
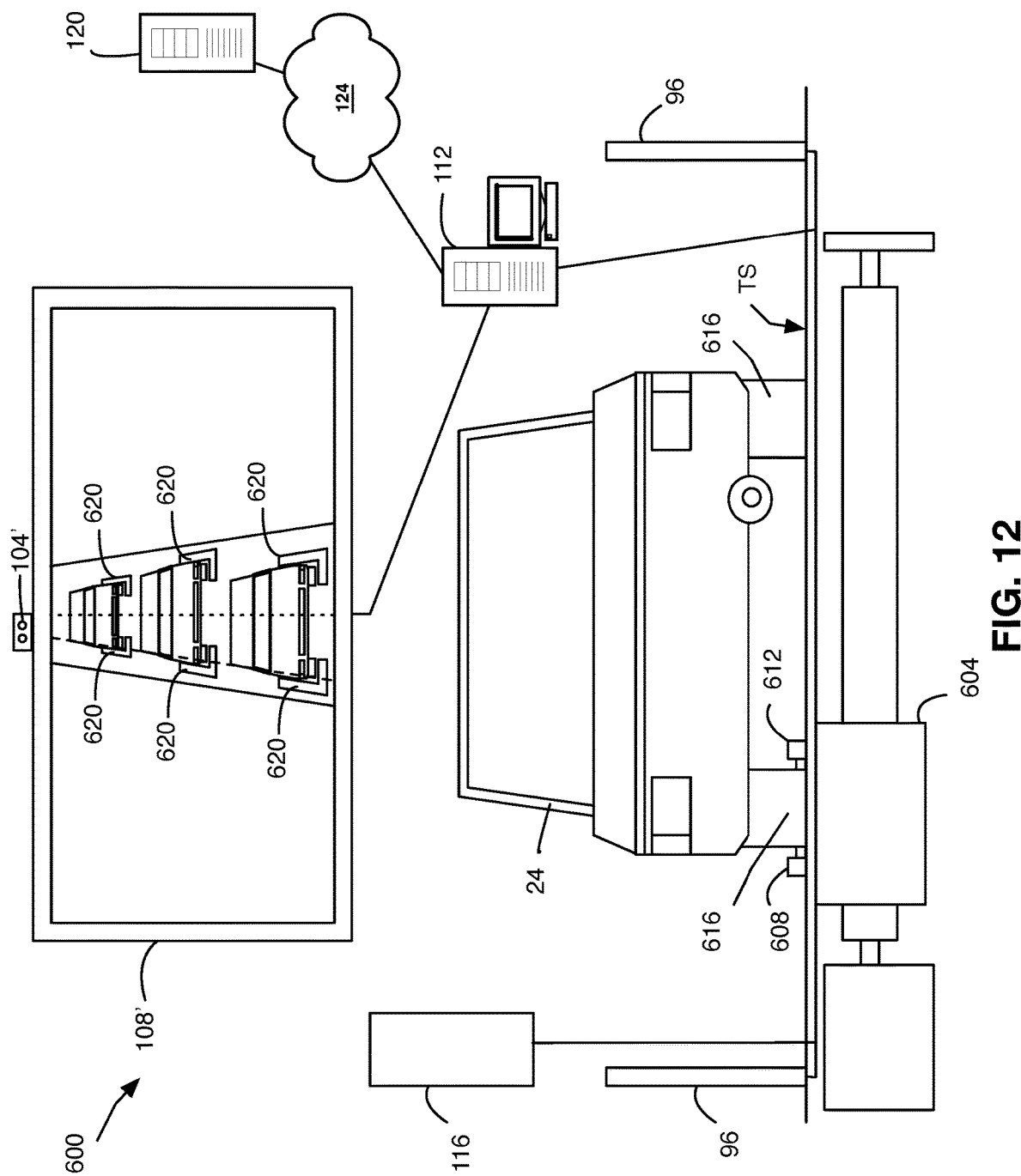
FIG. 12 shows an image presented by a display of a vehicle sensing system of a vehicle wash in accordance with yet another embodiment.

FIG. 12 shows a vehicle wash 600 in accordance with another embodiment, wherein the conveyor system includes a chain drive 604. An outside rail 608 and an inside rail 612 guide wheels 616 along one side of the vehicle 24 once the wheels 616 of the vehicle 24 are positioned therebetween. In this position, a dolly wheel engages one or more of the wheels 616 and urges them, and the car 24, forward. The vehicle 24 is placed in neutral and the wheels 616 on the other side of the vehicle 24 freely roll along a travel surface TS to enable the vehicle 24 to be guided by the rails 608, 612.

In order to guide vehicles into this conveyor system, the computer system 112 aligns vehicle positioning markers in the form of corner bounds 620 so that the wheels along the one side of the vehicle are aligned with the rails 608, 612. Thus, as shown, the computer system 112 generates vehicle positioning markers that guide drivers to align the wheels along the corresponding side of their vehicles 24 with the rails 608, 612.

Figure 13:
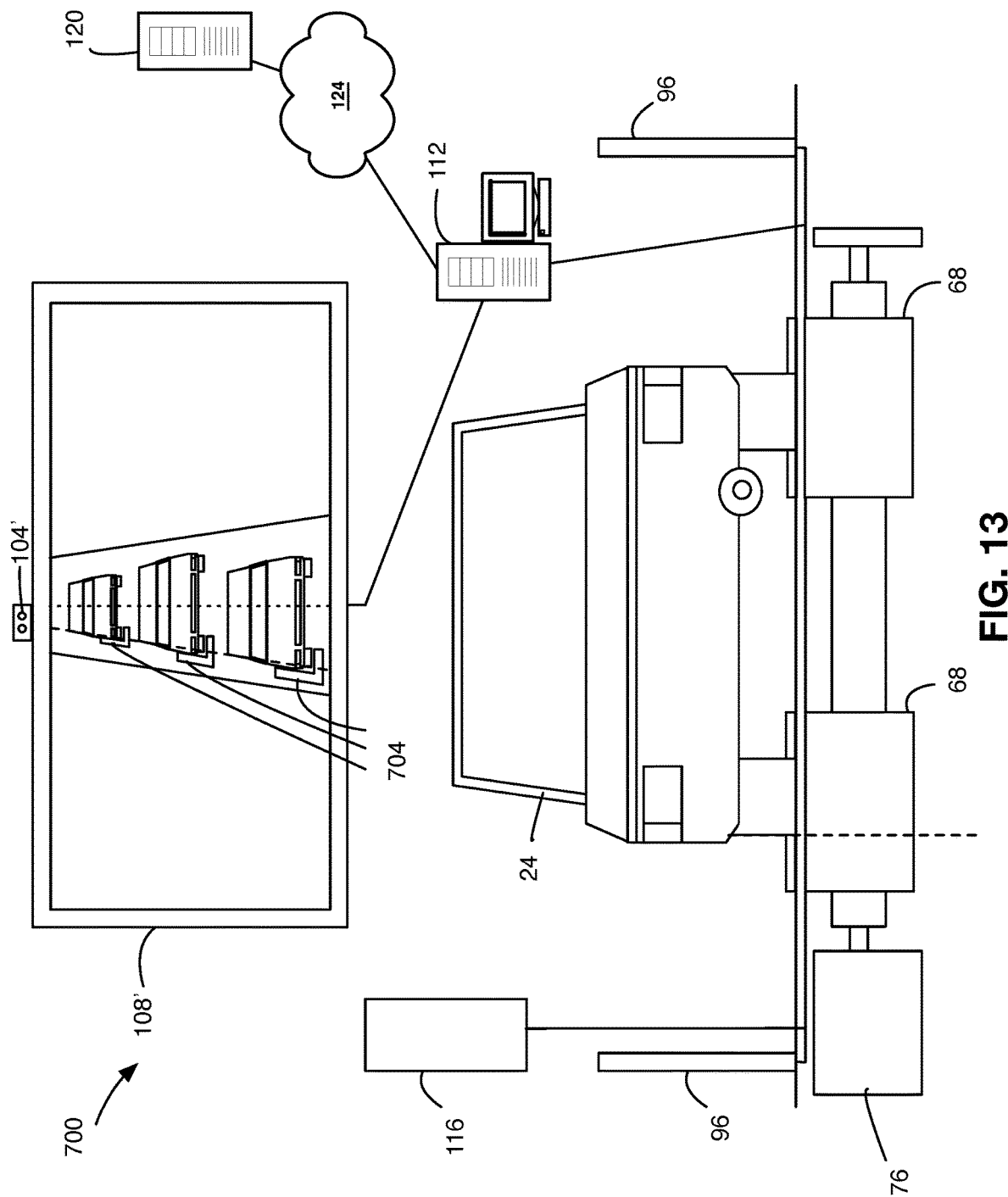
FIG. 13 shows an image presented by a display of a vehicle sensing system of a vehicle wash in accordance with still yet another embodiment.

FIG. 13 shows a similar vehicle wash system 700 in accordance with another embodiment, wherein only corner bounds 704 are shown on one side of the vehicles 24 on the display 108'. As the vehicles 24 only need to align along a single lateral side, the corner bounds 704 provide sufficient visual information to do so, while still enabling the computer system 112 to provide inter-vehicle spacing guidance for drivers of the vehicles 24.

Figure 14:
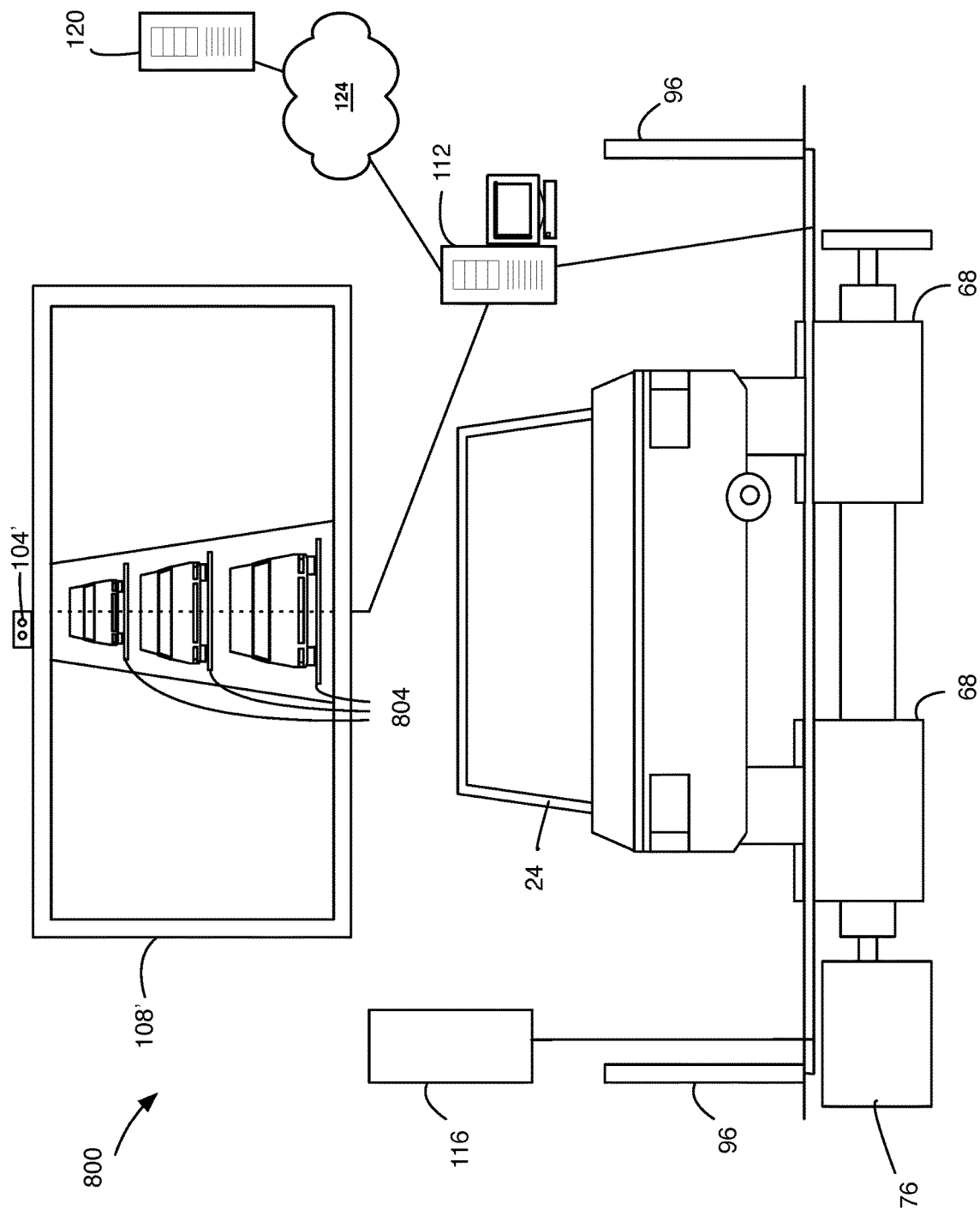
FIG. 14 shows an image presented by a display of a vehicle sensing system of a vehicle wash in accordance with a further embodiment.

FIG. 14 shows a similar vehicle wash system 800 in accordance with yet another embodiment, wherein vehicle positioning markers 804 extend laterally and perpendicular to a vehicle travel direction through the vehicle wash.

Computer-executable instructions for implementing the vehicle intake system on a computer system can be provided separately from the computer system, for example, on a computer-readable medium (such as, for example, an optical disk, a hard disk, a USB drive or a media card) or by making them available for downloading over a communications network, such as the Internet.

While the computer system is shown as a single physical computer, it will be appreciated that the computer system can include two or more physical computers in communication with each other. Accordingly, while the embodiment shows the various components of the computer system residing on the same physical computer, those skilled in the art will appreciate that the components can reside on separate physical computers.

An alert generated by the computer system in response to determining that there is at least one issue preventing safe operation of the vehicle wash for a vehicle can also be presented via an audible signal, a vibration pad positioned under the vehicle, or any other suitable means to alert a driver of a vehicle or a driver of the vehicle wash that the vehicle has at least one issue preventing safe operation of the vehicle wash.

In other embodiments, the surface map of the vehicle can be generated via one or more images or other sensor data from which a state of the vehicle making operation of the vehicle wash therewith unsafe can be determined. For example, a profile of the vehicle including any attachments can be determined from one or more images captured via an imaging sensor, such as a camera, and processed to identify a bike or ski equipment mounted on a rack secured to the vehicle. The computer system may then determine that operation of the vehicle wash with the vehicle may be unsafe in that it may damage the vehicle wash equipment and/or the bike or ski equipment.

Separate illumination can be provided to facilitate imaging of the vehicle as the vehicle approaches the vehicle wash.

Promotions, vehicle wash credits, advertising, etc. can be received from one or more remote servers.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. A vehicle sensing and guidance system for a vehicle wash, comprising:
    a vehicle sensing system having at least one sensor positioned to detect a position of a vehicle approaching the vehicle wash at least partially based on a distance between the at least one sensor and the vehicle and generate sensor data;
    a storage storing computer readable instructions;
    at least one processor that, when executing the computer readable instructions, determines the position of the vehicle using the sensor data; and
    at least one display connected to the at least one processor to present an image of the vehicle and a vehicle positioning marker, wherein the vehicle positioning marker indicates at least one of a target position and a target position range along a lateral axis perpendicular to a vehicle travel direction through the vehicle wash for loading the vehicle onto a conveyor system.

2. The system of claim 1, wherein the at least one display is configured to present the position of the vehicle and the vehicle positioning marker to a driver of the vehicle.

3. The system of claim 2, further comprising at least one display positioned inside of a structure of the vehicle wash for presenting the vehicle positioning marker to the driver of the vehicle.

4. The system of claim 1, wherein the vehicle is a first vehicle, wherein the at least one processor, when executing the computer readable instructions, determines a position of a second vehicle using the sensor data, and wherein the vehicle positioning marker indicates at least one of a target position and a target position range along a longitudinal axis parallel to the vehicle travel direction through the vehicle wash for the first vehicle determined at least partially based on the position of the second vehicle.

5. The system of claim 4, wherein the at least one processor, when executing the computer readable instructions, determines the velocity of the second vehicle from the sensor data.

6. The system of claim 5, wherein the at least one processor, when executing the computer readable instructions, generates the vehicle positioning marker at least partially based on the velocity of the second vehicle.

7. The system of claim 4, wherein the vehicle positioning marker is a first vehicle positioning marker, wherein the at least one processor, when executing the computer readable instructions, determines a velocity of the second vehicle from the sensor data, and determines a second vehicle positioning marker for the second vehicle positioning marker at least partially based on the velocity of the second vehicle.

8. The system of claim 4, wherein the at least one of the target position and the target position range is determined at least partially based on the distance between the first vehicle and the second vehicle determined by the at least one sensor.

9. The system of claim 1, wherein the at least one sensor includes at least one imaging sensor module.

10. The system of claim 1, wherein the at least one sensor includes at least one sonic sensor module.

11. The system of claim 1, wherein the at least one display includes a first display positioned outside of a structure of the vehicle wash, and a second display positioned inside of the structure of the vehicle wash.

12. The system of claim 1, wherein the at least one processor, when executing the computer readable instructions, generates a surface map of the vehicle via the sensor data.

13. The system of claim 12, wherein the at least one processor, when executing the computer readable instructions, determines the pose of the vehicle from the surface map of the vehicle.

14. The system of claim 1, wherein the at least one processor, when executing the computer readable instructions, determines a velocity of the first vehicle from the sensor data, and generates the vehicle positioning marker at least partially based on the velocity of the vehicle.

15. The system of claim 1, wherein the vehicle positioning marker includes a transverse edge normal to the vehicle travel direction.

16. The system of claim 15, wherein the transverse edge is at least a minimum target distance from a rear of the second vehicle.

17. The system of claim 16, wherein the longitudinal transverse edge is a target distance from the rear of the second vehicle, and wherein the target distance is dynamically determined.

18. The system of claim 1, wherein the at least one processor presents, via the at least one display, an additional first vehicle positioning marker spaced laterally from the vehicle positioning marker along the lateral axis normal to the vehicle travel direction through the vehicle wash, the additional first vehicle positioning marker indicating the at least one of the target position and the target position range.

19. The system of claim 1, wherein the vehicle positioning marker includes a lateral edge parallel to the vehicle travel direction.

20. The system of claim 19, wherein the vehicle positioning marker includes a lateral line parallel to the vehicle travel direction.

21. The system of claim 20, wherein the conveyor system is positioned to engage at least one wheel of vehicles along one lateral side thereof; and wherein the lateral line is positioned to align the at least one wheel along the lateral side of the vehicle with the conveyor system.

22. The system of claim 1, wherein the vehicle positioning marker includes a median line parallel to the vehicle travel direction.

23. The system of claim 1, wherein the vehicle is a first vehicle, wherein the vehicle positioning marker is a first vehicle positioning marker, wherein the at least one sensor is positioned to detect a position of a second vehicle, wherein the target position is a first target position, wherein the target position range is a first target position range, wherein the at least one processor determines the position of the second vehicle, wherein the at least one display presents the position of the second vehicle and a second vehicle positioning marker, wherein the second vehicle positioning marker indicates at least one of a second target position and a second target position range along the lateral axis perpendicular to the vehicle travel direction through the vehicle wash for loading the second vehicle onto the conveyor system.

* * * * *